UNITED STATES PATENT OFFICE.

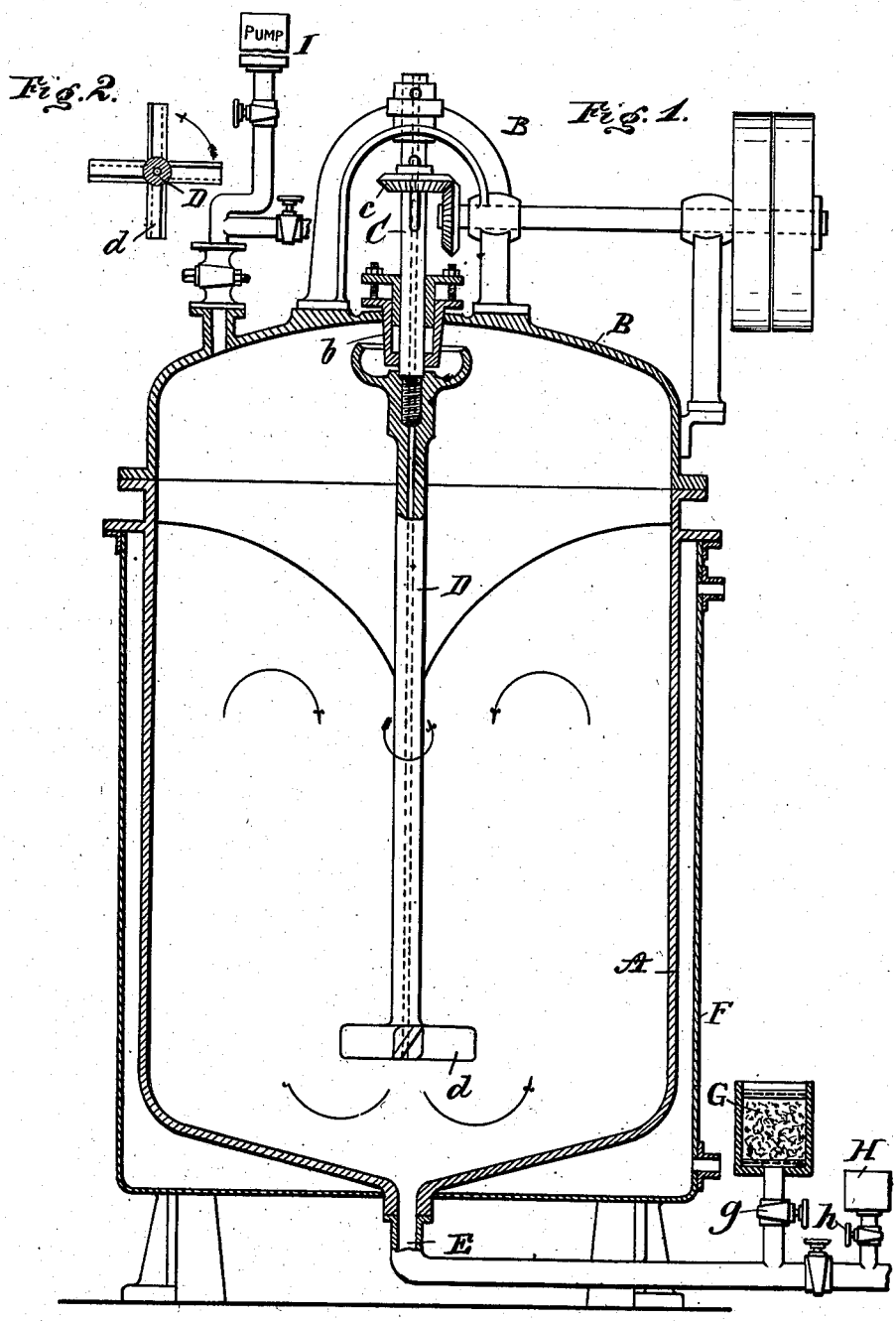

LEOPOLD NATHAN, OF ZURICH, SWITZERLAND, AND HANS BOLZE, OF MANNHEIM, GERMANY; SAID BOLZE ASSIGNOR TO SAID NATHAN.

PROCESS OF BREWING BEER.

No. 899,756.　　　　　Specification of Letters Patent.　　　　Patented Sept. 29, 1908.

Application filed June 1, 1901. Serial No. 62,732.

*To all whom it may concern:*

Be it known that we, LEOPOLD NATHAN, chemist, of Zurich, Switzerland, and HANS BOLZE, of Mannheim, in the Grand Duchy of Baden, Germany, have invented new and useful Improvements in Processes of Brewing Beer, of which the following is a specification.

Our invention relates to the art of brewing beer, and has for its object to provide a process by which the time required to produce well-keeping and marketable beer, is considerably reduced, by which the noxious influence of undesirable bacteria is avoided, and in which the fermentation can be controlled with certainty so as to vary the qualities of the beer produced and to give it the taste of lager beer.

The invention consists in a particular novel treatment which involves cooling, stirring, aeration, fermentation, and treatment with carbonic acid, the features which distinguish our invention from the prior state of the art being pointed out in the appended claims, while an example of the entire treatment is described in detail in the statement following hereinafter.

An apparatus suitable for the purposes of our invention is shown in the accompanying drawing, in which Figure 1 is a sectional elevation of the apparatus, and Fig. 2 is a top view of the stirrer which forms part of the apparatus.

The vessel A has a cover B for closing it hermetically, and the inner walls should be devoid of projections to facilitate cleaning, and should be enameled so as to protect the wort and the beer against the injurious influence of contact with metal. The cover has a stuffing box $b$ and a bracket B' in which is journaled the vertical shaft C driven by bevel gearing $c$ and carrying at its lower end the spindle D provided with the stirrer $d$; the latter as shown consists of four blades or wings inclined relatively to the axis of rotation. At the bottom of the receptacle A is located a supply pipe E, and the vessel A is further surrounded by a jacket F through which a heating medium or a cooling medium may be circulated. The supply pipe E is connected with the surrounding air through the medium of air filter G of any suitable construction (a box filled with cotton batting will do), the connection being controlled by a valve $g$. The pipe, E, also has another connection, controlled by a valve $h$ and leading to a vessel H adapted to contain the yeast used for producing fermentation. The air or the yeast may be conveyed through the supply pipe E either by pressure, or by suction, as by means of a vacuum pump I connected with the upper part of the vessel A or with the cover B thereof.

The process of brewing beer according to our invention is as follows: A wort is prepared in any approved manner, our invention having no reference to the production of the wort. This wort is, while hot, introduced into the cooling and fermenting vessel A, through the jacket F of which a cooling agent (such as brine) is circulated. We thus dispense with a separate cooler. The stirrer $d$ is rotated so as to cause the wort to be thrown out against the cooled walls and to then flow back toward the spindle D, thus keeping the entire body of wort agitated and hastening the cooling action. As a rule, the wort is cooled to a temperature of from 7 to 10° centigrade, this temperature being somewhat higher than that usually employed. We are enabled to stop the cooling earlier than ordinarily practiced, for the reason that great care is taken to exclude all undesirable germs. This is secured partly by enameling the surfaces with which the wort comes in contact, and partly by keeping the vessel hermetically tight and sterilizing the air which is admitted during the cooling operation. This air passes through the filter G and supply pipe E, being sucked in by the pump I, it being understood that at this time the valve $g$ is open and the valve $h$ is closed. The wort absorbs the air thus introduced, and the saturation with air is promoted by the agitation effected by the stirrer $d$. The wort receives a whirling motion, so that it assumes the shape of a funnel, and thus cooling and aeration are effectively carried out at the same time.

When the wort has been cooled to the temperature hereinbefore indicated, we introduce into it pure culture yeast from the vessel H, by the action of the pump I, the valve $h$ now being opened, while the valve $g$ may be closed. The preparation or culture of the yeast prior to its introduction into the wort may be done in any approved manner and forms no part of our present invention. The yeast should preferably be in a viscous or semi-liquid state, so that it may be conveyed through the supply pipe E by pressure or suction. The stirrer is then set into rapid rotation (160 revolutions a minute, more or less), and this is kept up for about two hours. The circulation and whirling of the wort causes a most minute and uniform subdivision of all solid and gaseous substances contained in the liquid. Not only is there a thorough agitation of the air which has been introduced during the cooling and which may still be introduced during this second step (the fermentation) or during part thereof, but the yeast which may have a tendency to rise to the surface is forced downward at the center of the vessel. Of course the subdivision of the yeast and its uniform distribution within the wort accelerate the fermentation, as a very large active surface is obtained for the yeast. The energetic stirring also has a beneficial influence on the growth of the yeast. It is well-known that the development of yeast takes place by the budding or formation of new cells at the sides of the original cells, the new cells growing by degrees while still in connection with the original cells, and also becoming linked or connected with other cells. The rapidly rotating stirrer we employ separates the new cells from the old ones as soon as the former have attained a certain growth, and thus the new cells are isolated to form new foci of growth, it having been found that single cells generate new cells more rapidly and abundantly than cells which have remained connected with the original cells. The advisability of continuing the introduction of air during the fermentation is determined by the amount of air previously introduced and by the quality of the yeast; that is, if the yeast used is capable of satisfactory development in the aerated wort, such as the said wort is at the end of the cooling of the wort, it will not be necessary to continue the aeration during the fermentation. Any experienced brewer can tell from the appearance of the yeast whether or not it it is in proper condition for further development, and if it is in such condition at the end of the cooling operation, aeration during fermentation will not be necessary. The violent agitation of the yeast by the stirrer rotating at a comparatively high speed continuously breaks up the yeast cells and prevents them from growing beyond a certain size, and therefore keeps them of a uniform relatively small size; when this violent agitation is stopped, the cells will begin to grow in a practically uniform manner and will get linked to each other until the full growth has been attained. When the attendant ascertains that there is no further growth, he knows that it is time to again violently agitate the liquid. We have found that violent agitation which isolates the yeast cells makes such cells much more active than if they are allowed to grow undisturbed all the time. The strong stirring is continued for about two hours, as above stated, and then is arrested for three or four hours. During this period of rest, the cells are allowed to grow undisturbed and form alcohol in the usual manner. The wort should be kept cool during fermentation, about 10° centigrade being a suitable temperature.

The carbonic acid which is generated during the fermentation is recovered for further use. The period of rest (three or four hours) should be followed by another period of strong agitation (about two hours), and it is best to begin the new stirring action when several of the newly-developed cells of the preceding period have attained their full growth; that is to say, when they cease to increase in bulk. When the attendant by inspection ascertains that this condition exists, he will start the stirrer anew. It will therefore be understood that the length of the period of rest may vary in different cases. For two or three days, the wort is thus alternately agitated violently (for about two hours) and then allowed to remain at rest (for about three or four hours), so as to separate the yeast cells from each other and distribute them within the wort, and then again to allow new cells to grow to full size, with the concurrent formation of alcohol and carbonic acid. These periods of agitation and rest should succeed each other without intermission for two or three days as stated. The introduction of air, which may take place (preferably periodically) during this fermentation, serves not only to promote the development of the yeast by supplying more oxygen thereto, but as the air passes through the wort, and leaves the receptacle A, said air carries with it volatile substances which form the raw and immature bouquet of fermentation, or at least part of these substances.

The violent fermentation produced as above described by alternate periods of agitation and rest, should be continued until the beer attains about three-fourths of the intended alcoholic strength. The existence of this condition might be ascertained by a direct test of alcoholic strength or indirectly by the appearance or amount of the yeast developed. In practice the latter indirect method is employed on account of its greater simplicity since it requires nothing but ocular observation. Any experienced brewer can tell the condition of the yeast by its appearance. Aeration should in any event be discontinued after the violent fermentation, otherwise the beer would acquire a flat taste.

When the beer has attained about three-fourths of the desired alcoholic strength, a period of rest of about twelve hours is allowed to elapse, during which the old cells will mature, imparting to the beer its old or matured flavor. These cells being in a state of fine subdivision will settle slowly. After this period of rest, the stirrer is again rotated for a short time, but much more slowly than during the preceding periods of agitation, for instance, with fifty revolutions a minute. During this slow stirring, the so-called "break" or agglomeration of the cells in the form of lumps occurs. These lumps are formed and precipitated more rapidly than in the process of fermentation used hitherto. The stirring is done slowly in order to avoid breaking up the lumps. The beer which is thus separated from the precipitate is almost entirely clear.

During the comparatively long period of rest (twelve hours) and the agitation which follow the violent fermentation, carbonic acid is passed through the beer. This carbonic acid takes up, and carries away the immature bouquets formed during fermentation, without giving a flat taste to the beer, and is also partly absorbed by the beer. The carbonic acid may be treated in any suitable way after its passage through the beer, in order to remove the raw bouquet from the acid, and the acid thus purified may be sent again through the liquid to take up another proportion of the immature bouquet. The carbonic acid formed during fermentation may be stored and added to the beer. The passage of carbonic acid through the wort or beer as distinguished from the mere introduction and absorption of carbonic acid, is of great importance, as it removes the raw bouquet without impairing the flavor of the beer. During the occurrence of the "break" and the precipitation of the yeast, the temperature (which, as stated, should be about 10° centigrade during the fermentation) rises a few degrees. This promotes the separation of the yeast. The beer is drawn off into another vessel, so as to separate it from the precipitated yeast. The beer thus produced only needs clarification to convert it into a readily marketable product. It need not be stored for a certain length of time, but has at the end of the entire process, which lasts about four or five days, the flavor and taste of well-matured beer. Further, the beer thus produced keeps exceedingly well. If it is desired to further improve the keeping quality of the beer, it may be pasteurized, in which case a lower degree of heat will suffice than is ordinarily required, on account of the absence of any germs except the yeast. The beer is finally impregnated with carbonic acid.

We desire it to be clearly understood that the attendant will have to be guided by the appearance of the wort and beer, as well as by the taste thereof, in determining the proper time for beginning and ending the various steps of the process hereinbefore described. The specific periods of time named in this description may therefore be varied considerably without departing from the nature of our invention. While we have described the use of carbonic acid for the purpose of removing the raw bouquet, we desire it to be understood that any other indifferent gas may be employed, that is, any gas which does not injuriously affect the beer, and the claims in which carbonic acid is mentioned in this connection are to be interpreted as covering other indifferent gases as equivalents.

What we claim as our invention, and desire to secure by Letters-Patent, is:—

1. In the brewing of beer, the improvement which consists in stirring and aerating the wort and simultaneously cooling it, then introducing yeast and giving the wort, during the ensuing fermentation, alternate periods of agitation and rest, until about three-fourths of the intended alcoholic strength has been produced, then giving the beer a further period of rest and passing carbonic acid through it during such period, moderately stirring the beer to cause a precipitation of the yeast, and finally separating the beer from the yeast.

2. In the art of brewing beer, the improvement in the fermentation of the wort which consists in introducing yeast into the wort and giving the latter, during the ensuing fermentation, alternate periods of strong agitation and of rest, until about three-fourths of the intended alcoholic strength has been produced, then giving the beer a further period of rest and passing carbonic acid through it during such period, moderately stirring the beer to cause a precipitation of the yeast, and finally separating the beer from the yeast.

3. In the art of brewing beer, the improvement in the fermentation of the wort which consists in introducing yeast into the wort and giving the latter, during the ensuing fermentation, alternate periods of agitation and rest, and terminating this procedure before the beer has attained the desired final alcoholic strength, then giving the beer a further period of rest and passing carbonic acid through it during such period, moderately stirring the beer to cause a precipitation of the yeast, and finally separating the beer from the yeast.

4. In the art of brewing beer, the improvement in the fermentation of the wort which consists in passing carbonic acid through the wort after the main fermentation, and then separating the yeast from the beer.

5. In the art of brewing beer, the improvement in the fermentation of the wort which consists in subjecting the wort first to violent and then to relatively slow fermentation and passing carbonic acid through the wort during the slow fermentation.

6. In the art of brewing beer, the improvement in the fermentation of the wort which consists in subjecting the wort first to violent and then to relatively slow fermentation, aerating the wort during the violent fermentation, and passing carbonic acid through the wort during the slow fermentation.

7. In the art of brewing beer, the improvement in the fermentation of the wort which consists in subjecting the wort first to violent fermentation until about three-fourths of the intended alcoholic strength is obtained, and then to relatively slow fermentation.

8. In the art of brewing beer, the improvement which consists in fermenting the wort, and then passing a current of carbonic acid through the wort during a considerable length of time, so that carbonic acid enters into the wort and at the same time carbonic acid, laden with the immature bouquets which it has taken up from the liquid leaves the wort.

9. The herein described improvement in the art of manufacturing beverages, consisting of the cooling of the wort; the sowing of the wort with yeast; the forced fermentation of the wort consisting of the aerating thereof by forcing air thereinto and agitating the same periodically; and at the end of the violent fermentation thus produced, the ripening of the product by the injection of $CO_2$, all in one continuous operation in a single closed vessel.

In testimony whereof, we have signed our names to this specification, in the presence of two subscribing witnesses.

LEOPOLD NATHAN.
HANS BOLZE.

Witnesses as to the signature of Leopold Nathan:
   A. LIEBERKNECHT,
   H. GUERIN DE WALD ERBACH.

Witnesses as to the signature of Hans Bolze:
   OSCAR BOCK,
   FRITZ ULLMANN.